(No Model.)
S. D. STOUT.
HAND CULTIVATOR.
No. 302,050. Patented July 15, 1884.
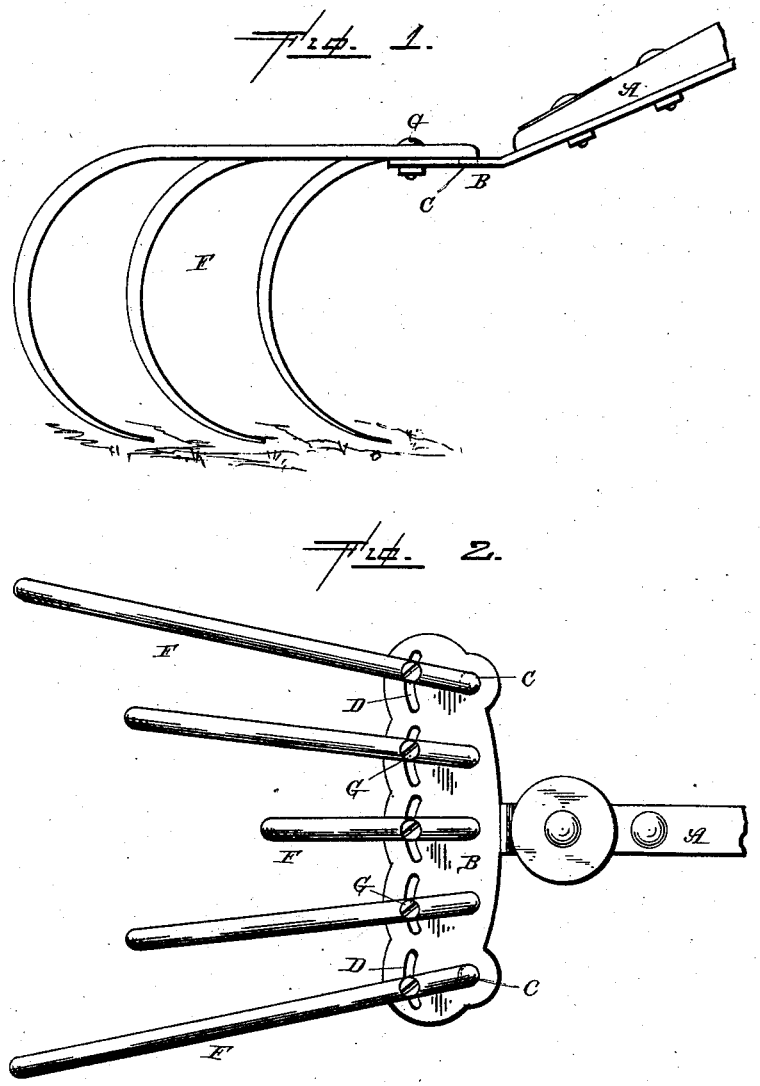

UNITED STATES PATENT OFFICE.

STEPHEN D. STOUT, OF NOVELTY, MISSOURI.

HAND-CULTIVATOR.

SPECIFICATION forming part of Letters Patent No. 302,050, dated July 15, 1884.

Application filed March 18, 1884. (No model.)

*To all whom it may concern:*

Be it known that I, STEPHEN D. STOUT, of Novelty, in the county of Knox and State of Missouri, have invented certain new and useful Improvements in Hand-Cultivators; and I do hereby declare the following to be a full, clear, and exact description of the invention, such as will enable others skilled in the art to which it pertains to make and use it, reference being had to the accompanying drawings, which form part of this specification.

My invention relates to an improvement in hand-cultivators; and it consists in the combination of a suitable plate or body, which is secured to the lower end at right angles, and which is provided with a series of holes and a corresponding number of curved slots, with the tines which have their inner ends bent at right angles, so as to catch in the holes, and which are held in any desired relation to each other by suitable clamping-bolts, which pass down through the tines and the curved slots, as will be more fully described hereinafter.

The object of my invention is to provide a hand-cultivator, which is specially designed for use in gardens, and in which the curved tines can be arranged in any desired relation to each other.

Figure 1 is a side elevation of a cultivator embodying my invention. Fig. 2 is a plan view of the same.

A represents a handle, and B the plate or body, which is rigidly clamped thereto by any suitable devices. From this plate are made a number of openings, C, and a corresponding number of curved slots, D, which are arranged in relation to each other as shown.

The tines F have their front ends turned at right angles, for the purpose of passing down through the opening C, and thus form pivots upon which the tines are made to turn. Passed down through the tines and through the curved slots are the clamping-bolts G, by means of which the tines can be rigidly clamped in any desired relation to each other. The outer ends of the tines are flattened and sharpened, as shown, and are specially adapted for working in gardens. By forming a pivot upon the front end of each tine, and making them movable in relation to each other, they can be adjusted near together or far apart, according to the distance between the rows of growing plants.

An implement constructed as here shown and described is adapted for loosening the ground, weeding, and other such purposes.

Having thus described my invention, I claim—

In a cultivator, the combination of the handle, the body or plate secured thereto, and provided with pivotal openings and curved slots, with the tines having their front ends formed into pivots, and the clamping-bolts which pass through the tines and the curved slots in the plate or body, substantially as shown and described.

In testimony whereof I affix my signature in presence of two witnesses.

STEPHEN D. STOUT.

Witnesses:
A. L. ROSS,
C. A. ROSS.